(12) United States Patent
Humblet

(10) Patent No.: US 7,280,592 B1
(45) Date of Patent: Oct. 9, 2007

(54) HYBRID DIGITAL/ANALOG DEVICE

(75) Inventor: Pierre A. Humblet, Cambridge, MA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/051,687

(22) PCT Filed: Oct. 23, 1996

(86) PCT No.: PCT/FR96/01657

§ 371 (c)(1),
(2), (4) Date: Oct. 10, 2000

(87) PCT Pub. No.: WO97/16009

PCT Pub. Date: May 1, 1997

(30) Foreign Application Priority Data

Oct. 23, 1995 (FR) .................................. 95/12672

(51) Int. Cl.
*H04B 1/38* (2006.01)
(52) U.S. Cl. .................. 375/222; 375/220; 379/93.01; 379/93.07
(58) Field of Classification Search ................ 375/219, 375/220, 222, 232, 236, 216, 231, 348, 377, 375/243; 708/322, 323; 370/466, 465, 524, 370/468, 467; 379/93.07, 93.03; 714/746; 341/150
See application file for complete search history.

(56) References Cited

U.S. PATENT DOCUMENTS

| | | | | | |
|---|---|---|---|---|---|
| 4,032,762 | A | * | 6/1977 | Caloyannides | 708/322 |
| 5,134,611 | A | * | 7/1992 | Steinka et al. | 370/466 |
| 5,159,610 | A | * | 10/1992 | Eyuboglu et al. | 375/290 |
| 5,319,674 | A | * | 6/1994 | Cherubini | 375/232 |
| 5,483,530 | A | * | 1/1996 | Davis et al. | 370/465 |
| 5,528,625 | A | * | 6/1996 | Ayanoglu et al. | 375/222 |
| 5,572,524 | A | * | 11/1996 | Harada et al. | 370/468 |
| 5,671,251 | A | * | 9/1997 | Blackwell et al. | 375/222 |
| 5,710,790 | A | * | 1/1998 | Herzberg et al. | 379/219 |

OTHER PUBLICATIONS

The capacity of PCM voiceband channels Kalet, I.; Mazo, J.E.; Saltzberg, B.R.; Communications, 1993. ICC 93. Geneva. Technical Program, Conference Record, IEEE International Conference on, vol. 1, May 23-26, 1993 pp. 507-511 vol. 1.*

* cited by examiner

*Primary Examiner*—Temesghen Ghebretinsae

(57) ABSTRACT

A device is for communication between a digital adapter linked to an exchange by means of a digital interface and an analog adapter linked to an exchange by means of an analog interface, said exchanges being linked by means of a telecommunications network. Digital information from the digital adapter is sent to the analog adapter, and vice versa, in digital form without emulating an analog signal.

13 Claims, 3 Drawing Sheets

HYBRID DIGITAL/ANALOG DEVICE

FIELD OF THE INVENTION

The present invention relates to a device for hybrid digital/analog communication on a telephone channel, and a method of transmission able to be employed by such a device.

BACKGROUND

The growth in the installed base of personal computers and the emergence of new data communications services testify to the potential for growth in the volume of on-line communications. Although the current situation is satisfactory for large-scale users who are able to connect their internal networks to external services via high-speed transmission networks or leased lines, the cost of such solutions is too high for small businesses or individuals.

It seems certain that this situation will change, and that the necessity of distributing services involving a high transmission rate right to private residences will be at the origin of a widespread broadband network. However, there is little chance of such a network being deployed globally for several years, or even tens of years.

While awaiting the availability of such a high-speed network, individuals, schools and small businesses have to resort to transmitting data on the telephone network. To do that, they have the choice between two known technologies. The most widespread solution consists in using modems operating at a rate of 14.4 kb/s or 28.8 kb/s. A more expensive solution consists in using the ISDN network, which has two data channels at 64 kb/s and a signaling channel at 16 kb/s. However, this second solution is not available everywhere, and requires substantial investment for the users in the form of higher subscriber tariffs and suitable communications hardware.

A modem is known from EP-A-0 669 740 from AT&T Corp. which is intended to be used with analog subscriber lines at the two ends of the transmission path. This modem comprises means for separately equalizing each loop of an analog telephone network connection, by using a plurality of transmission filters and a plurality of reception filters. The filters are used in such a way that, in the direction of transmission from the modem to the exchange, the voltage samples sent by the coding/decoding stations are equivalent to the quantization levels of the exchange.

The need to use prescribed levels for the quantization law makes it impossible to choose the levels which have the best resistance to noise in the presence of an echo signal.

Furthermore, the above document does not describe a device for communication between a digital adapter and an analog adapter, in which the digital adapter would be linked to an exchange via a digital interface.

BRIEF DESCRIPTION OF THE DRAWINGS

The invention will be better understood on reading the following description given by way of non-limiting example, and by the attached drawings, in which.

DETAILED DESCRIPTION OF THE DRAWINGS

Figure 1:
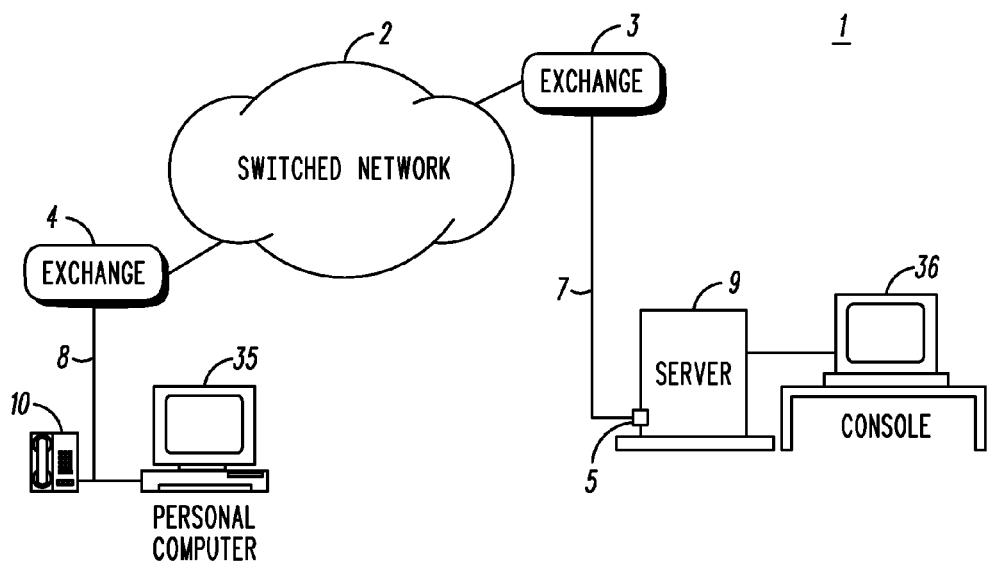
FIG. 1 represents a theoretical diagram of the communications device implementing the invention.

The object of the invention is to propose a third alternative, which is able to use the advantages of a network such as, for example, the ISDN network, and particularly a higher transmission speed, of the order of 64 kb/s, while not entailing additional costs particularly for users, with respect to the cost of conventional solutions operating at 14.4 kb/s.

To that end, the invention relates to a device for communication between a digital adapter linked to an exchange by means of a digital interface, particularly of ISDN type, and an analog adapter linked to an exchange by means of an analog interface, said exchanges being linked by means of a telecommunications network, which includes means for direct linking between the digital adapter and the analog adapter, the digital information from the digital adapter being sent to the analog adapter, and vice versa, in the digital form without emulating an analog signal.

According to other characteristics of the invention:

said direct link means include, in the direction of transmission going from the digital adapter to the analog adapter, a digital transmitter situated in the digital adapter and able to transmit, to an analog receiver situated in the analog adapter, analog pulses the voltage levels of which represent the information transmitted from the digital adapter to the analog adapter;

said direct link means include, in the direction of transmission going from the analog adapter to the digital adapter, an analog transmitter situated in the analog adapter and able to transmit, to a digital receiver situated in the digital adapter, an analog signal such that, when it is sampled by the analog interface of the exchange, it will equate to the sum of a value able to be determined by the digital information item transmitted by the analog adapter to the digital adapter, and of the echo of the signal transmitted by the digital adapter, without the said value having to be equal to a level of the quantization law, the receiver of the analog adapter includes an adaptive linear equalizer connected at its input to the output of an analog/digital converter, and connected at its output to the input of an output equalizer linked to the user's equipment, so that the response at the output of the adaptive linear equalizer is a partial response, for example a class IV response.

said output equalizer is a decision feedback equalizer or a Viterbi equalizer.

said partial response is determined adaptively, said output equalizer is a decision feedback equalizer or a Viterbi equalizer, said means include, at the digital adapter end, an n-level selector, n being equal, particularly, to 64, which are represented in the form of a byte, from among N=256 possible quantization levels, said level selector being connected, at its input, to the user's equipment and, at its output, to a digital interface;

the transmitter of the analog adapter includes a line coder followed by a predistortion filter which synthesizes a partial response, for example a class TV partial response.

said partial response is determined adaptively;

the digital adapter includes a decoder connected, at its input, to an echo filter and to the output of the digital interface of the digital adapter, said decoder delivering at its output to the user's equipment the most likely sequence of groups of bits transmitted by the analog adapter, given the echo of the signal produced by the digital adapter.

The invention also relates to a method of direct transmission between an analog adapter and a digital adapter, bidirectionally.

In the direction of transmission going from the digital adapter to the analog adapter, this method includes stages consisting in:

taking a group of bits originating from a source of digital data, for example a group of 6 bits;

choosing one from among n (n=64) levels preselected from among N (N=256, in particular) voltage levels, each level being represented in digital form by one byte;

successively sending the bytes corresponding to the selection of one from among n levels through the digital network to an analog adapter, so as, in the analog adapter, to produce signals the amplitude of which is substantially equal to the levels represented by each byte, the signals corresponding to successive bytes interfering with one another so as to produce a resultant analog signal in the analog adapter;

equalizing said resultant analog signal so as to eliminate the interference;

measuring the amplitude of the resultant analog signal and deducing the digital value of the byte therefrom;

from the digital value of the byte, reconstituting the group of bits and sending it to a digital data receiver.

The method of transmission from an analog adapter to a digital adapter in a communications system includes the stages consisting in:

taking a group of bits originating from a data source connected to the communications system;

selecting an analog signal having an amplitude corresponding to the digital value of the group of bits, the signals corresponding to successive groups interfering with one another and having a shape such that, at the moment when the analog signal is sampled in the analog interface of the exchange, its value is substantially equal to the sum of a value able to be determined by the digital information item transmitted by the analog adapter to the digital adapter, and of the echo of the signal transmitted by the digital adapter, without said value having to be equal to a level of the quantization law, so that following the sampling of the analog signal, a byte appears in the digital adapter, representing the said sum;

processing the successive bytes so as to retrieve the most likely sequence of the group of bits, given the echo of the signal transmitted by the digital adapter;—transmitting the digital value of the groups of bits retrieved to the user's equipment.

Referring to FIG. 1, the overall architecture of a communications device 1 is represented in this figure, using a public switched network 2 for the transmissions between two exchanges 3, 4 linked respectively, at one end, to a digital adapter 5 via a digital interface 7, and, at the other end, to an adapter 6 called analog adapter, that is to say one connected by a simple conventional telephone interface 8.

A digital server 9, which is, for example, a server accommodating high-speed applications, is connected to the digital exchange 3 by a line 7 and a digital adapter 5 of the server 9.

The terminal 35 takes the form, particularly, of a personal computer connected to the analog adapter 6. The adapter and a telephone 10 are connected by the simple telephone line 8 to the exchange 4. Hence, analog information transits on the analog line 8: the telephone 10 user's voice, or digital information output by or addressed to the analog adapter 6.

By virtue of this architecture, which is known in the case in which the analog adapter is a conventional modem, it is possible to call a conventional analog line 8 from a server 9, and vice versa. This possibility is already used to transmit speech or data. When the digital signal originating from a digital adapter 5, after transport by the network 2, arrives at the telephone exchange 4, the bytes of the digital signal are converted, by a digital/analog converter incorporated in the exchange 4, into voltage levels, which is done at a sampling frequency which is normally 8,000 times per second. This digital/analog (D/A) conversion takes place according to a conversion law, for example the "A" law in Europe, or the "$\mu$" (mu) law in other parts of the world. In the other direction, that is to say in the direction from the analog adapter 6 to the digital adapter 5, the analog voltage received by the exchange 4 is digitized by a sampler and represented bytes. These bytes, after transport by the network 2, are sent to the digital adapter 5.

Overall, a connection as described above allows a digital adapter 5 to communicate with an analog adapter 6.

Traditionally, the digital adapter 5 sends a sequence of bytes which, after conversion using an abovementioned law, correspond to a speech signal, or to a conventional modem signal. This signal is then processed normally; in the case of telephony, it is sent directly to the earpiece of the telephone handset 10. Similarly, the analog adapter 6 traditionally consists of a modem. The reverse operations are performed in the other direction of transmission. The invention proposes another method of transmission between an analog adapter 6 and a digital adapter 5, and a corresponding device.

Figure 2:
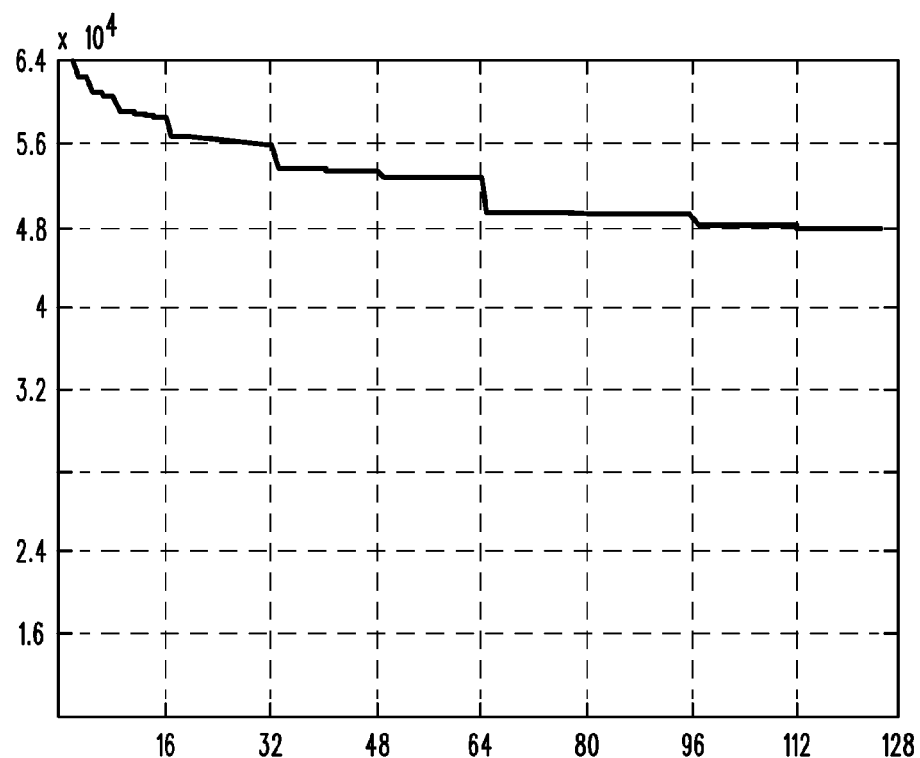
FIG. 2 represents a graph of the maximum transmission rate for a type A quantization law, as a function of the minimum distance between the n chosen quantization levels.

The principle of the invention is explained in connection with FIG. 2, which represents the compromise which exists between the transmission speed (in kilobits/second on the ordinate scale) and resistance to noise. If it is desired to transmit at 64 kb/s, all 256 quantization levels possible from eight bits ($2^8=256$) have to be used. However, for transmission subject to Gaussian noise, the error probability in the course of transmission depends on the minimum distance dmin (on the abscissa of FIG. 2) between two adjacent levels of the quantization scale, and this relationship is represented in FIG. 2, for a type A conversion law. It is noted, surprisingly, that by increasing the minimum distance dmin between levels from 2 to 4, not half of the quantization levels are lost, but only 33 levels out of 256. It results therefrom, similarly, that transmission at about 48 kb/s remains possible by using only 64 quantization levels separated by a distance of dmin=128.

The stages of the method of transmission in the two directions are then as follows, when the analog signal is quantified with respect to n=64 levels, allowing a rate of 48 kb/s.

For the method of transmission from a digital adapter to an analog adapter, the stages of the method comprise the following stages:

taking a group of bits originating from a digital data source, for example a group of 6 bits;

choosing one from among n (n=64, in particular) levels preselected from among N (N=256, in particular) voltage levels, each level being represented in digital form by one byte transmitted 8000 times per second;

successively sending the bytes corresponding to the selection of n levels through the digital network to an analog adapter, so as, in the analog adapter, to produce signals the amplitude of which is substantially equal to the levels represented by each byte, the signals corresponding to successive bytes interfering with one another so as to produce a resultant analog signal in the analog adapter;

equalizing said resultant analog signal so as to eliminate the interference;

measuring the amplitude of the resultant analog signal and deducing the digital value of the byte therefrom;

from the digital value of the byte, reconstituting the group of bits and sending it to a digital data receiver. The method of transmitting from an analog adapter to a digital adapter in a communications system includes the stages consisting in:

8000 times per second, taking a group of bits originating from a data source connected to the communications system;

selecting an analog signal having an amplitude corresponding to the digital value of the group of bits, the signals corresponding to successive groups interfering with one another, and having a shape such that, at the moment when the analog signal is sampled in the analog interface (8) of the exchange (4), its value is substantially equal to the sum of a value able to be determined by the digital information item transmitted by the analog adapter (6) to the digital adapter (5), and of the echo of the signal transmitted by the digital adapter (5), without said value having to be equal to a level of the quantization law, so that following the sampling of the analog signal, a byte appears in the digital adapter (5), representing the said sum;

processing the successive bytes so as to retrieve the most likely sequence of the groups of bits, given the echo of the signal transmitted by the digital adapter;

transmitting the digital value of the groups of bits retrieved to the equipment of the user.

Overall, the method of transmission does not try to reconstruct an analog signal for transmission on the line to the analog adapter. On the contrary, the bytes which represent the digital information are converted directly into voltage levels, as illustrated by the corresponding device in the upper part of FIG. 3, which concerns the transmission part of the digital adapter 5. For example, in order to communicate at 48 kb/s, the digital adapter 5 converts the bits received from the user into groups of 6 bits representative of voltage levels (i.e. 26=64 possibilities), sent 8000 times per second, and representing one from among the 256 levels of the conversion law. The 64 levels thus used in this example are chosen in such a way as to be separated from one another as far as possible so as to provide better resistance to noise. This separation is called the minimum distance dmin in what follows. The benefit of this approach is of eliminating the quantization noise introduced by the conversion law.

It should be noted that it is also possible to envisage, in a way known per se, using trellis-coded modulation in order to obtain better resistance to noise.

For interfacing with the interface 7, the digital adapter 5 principally includes an upper part (above the horizontal broken line) consisting of a digital transmitter 11, and a lower part 12 consisting of a digital receiver. The input of the digital transmitter 111 is fed from a digital data source, such as by the server 9 (FIG. 1). The input of the digital transmitter 11 which sees bytes passing representing the digital information coming from the server 9, is linked, through a buffer 13 if rate matching is necessary, to the input of a level selector 14, the output of which constitutes the output of the digital transmitter 11 of the digital adapter 5. This output of the digital transmitter 11 of the digital adapter 5 is connected, through the network 2, to the input of the receiving part of the analog adapter 6, which is represented at the upper part 15 of FIG. 4, the transmission part of the analog adapter 6 being represented by the lower part 16 of FIG. 4.

Figure 3:
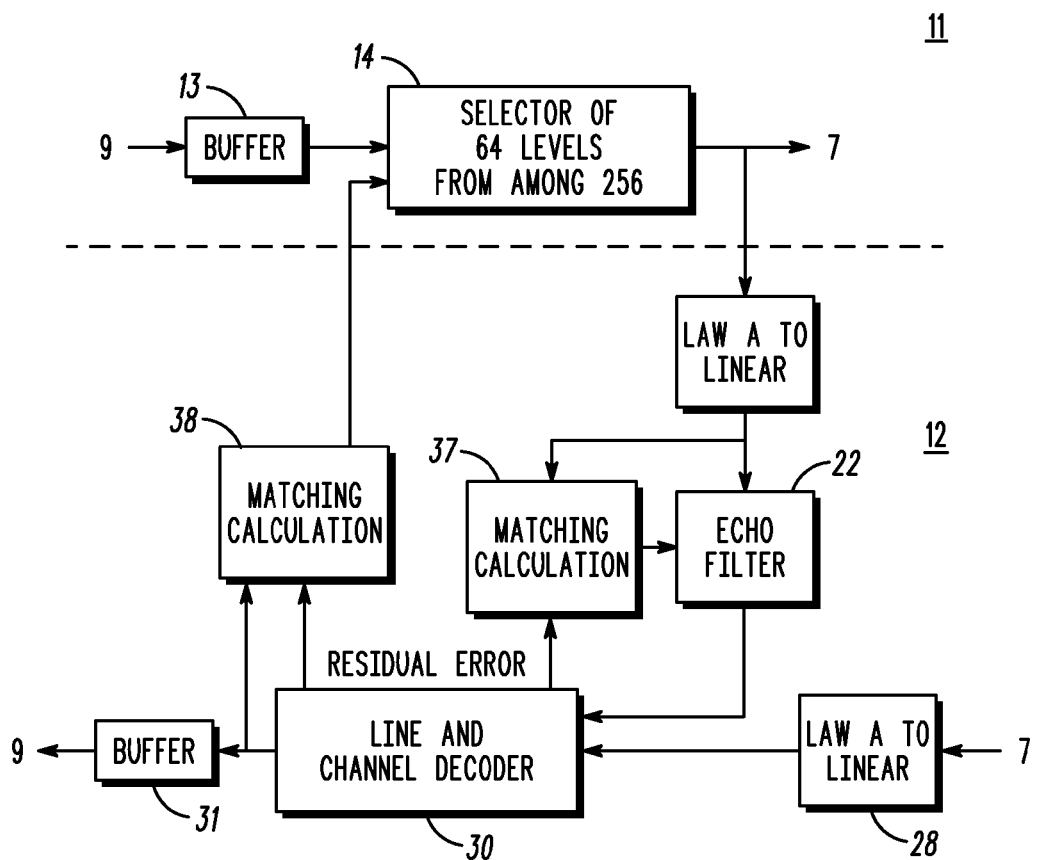
FIG. 3 represents a theoretical diagram of a digital adapter suitable for the device according to the invention.

The receiver 15 of the analog adapter 6 receives, at its input, (at the top of FIG. 4), a series of analog pulses the voltage levels of which represent the information transmitted by the digital adapter of FIG. 3. The presence of filters in the telephone exchange 4 causes interference between the successive pulses. It is therefore difficult to recognize them and to measure their levels.

The receiver 15 of the analog adapter 6 receives, at its input, (at the top of FIG. 4), a series of analog pulses the voltage levels of which represent the information transmitted by the digital adapter of FIG. 3. The presence of filters in the telephone exchange 4 causes interference between the successive pulses. It is therefore difficult to recognize them and to measure their levels.

Figure 4:
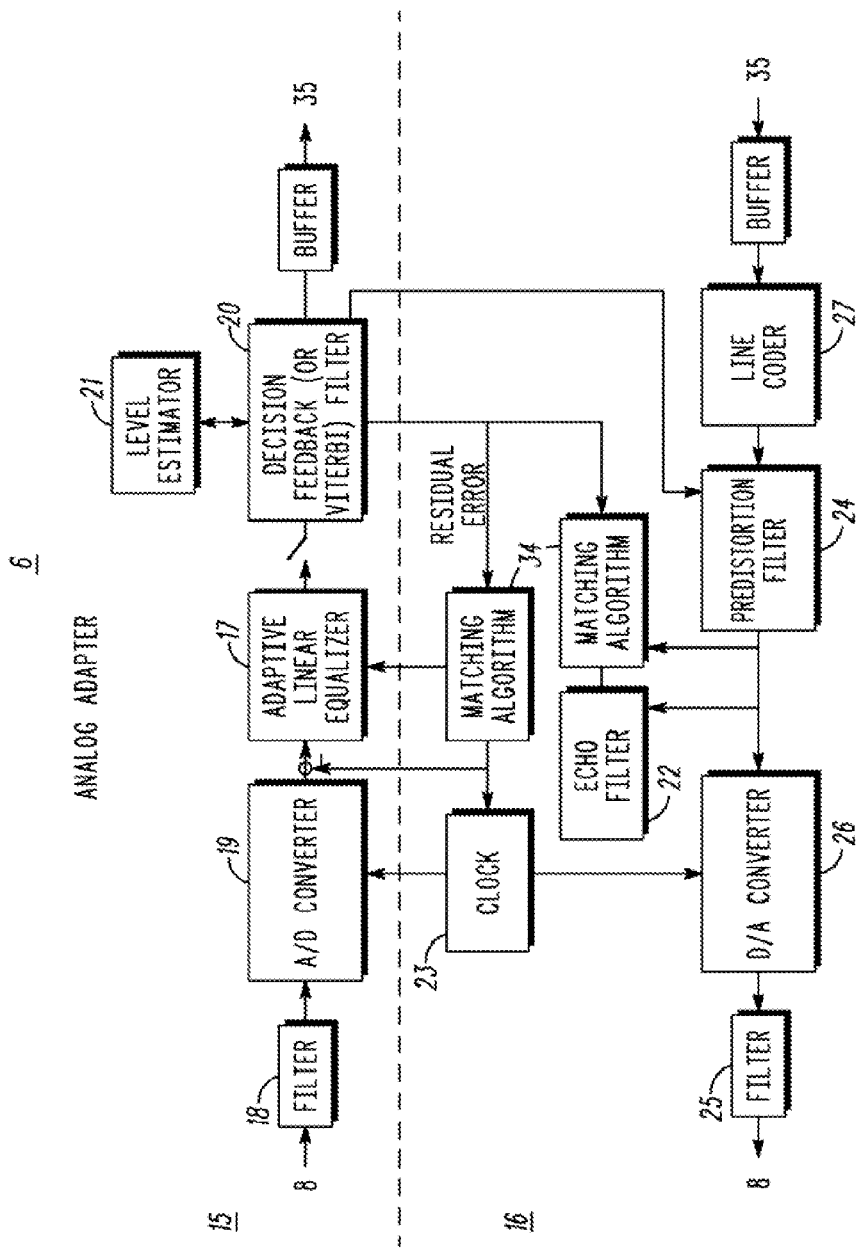
FIG. 4 represents a theoretical diagram of an analog adapter suitable for the device according to the invention.

The analog receiver 15 of the invention which is illustrated in the upper part of FIG. 4 consists of two main parts: an adaptive digital linear filter 17 which "equalizes" the signal, converting the distorted pulse originating from the network through a filter 18 and an analog/digital converter 19, into a well controlled pulse which introduces interference only between successive even (or odd) levels. For example, the output Yn of the equalization filter 17 at time n is given by one of the expressions:

$$Yn=Xn-Xn-2 \text{ (class IV)}$$

$$\text{OR: } Yn=Xn-Xn-1-Xn-2+Xn-3$$

$$\text{OR: } Yn=Xn-2Xn-2+Xn-4$$

or by a similar expression determined adaptively, where the Xn are the levels sent by the digital adapter 5.

This equalization system is known per se as a "class IV partial response". The invention makes it possible to apply such a response to a situation of direct communications between a digital adapter 5 and an analog adapter 6.

In order to avoid error propagation to the receiver, the use of differential coding at 14 is recommended, as is well known per se.

Moreover, if the linear equalization filter 17 has to be adaptive, the choice thereof is within the scope of the person skilled in the art.

At this point, the interference between symbols, which is expressed by the relationship Yn=Xn−Xn−2 remains to be eliminated. To this end, two known techniques can be used: decision-feedback equalization (DFE) and the Viterbi algorithm, which are represented by the functional block 20.

The Xn levels produced by the telephone exchange 4 are not always equal to their nominal levels provided by the quantization law. The analog receiver 15 therefore has to estimate the real value of the Xn and these real values have to be used in the decision-feedback equalizer, or the Viterbi equalizer 20. The estimate can be made by using one of the variations of the least-squares algorithm, implemented in a functional block 21.

It should be noted that the real values of the Xn, have also to be used in an echo canceler 22 of the digital adapter (FIG. 3). To this end, the digital adapter 5 may itself also produce an estimate of the real values with the aid of a functional block similar to the block 21 of FIG. 4, or else use corresponding check information transmitted by the analog adapter 6. The corresponding links are not represented in the figures for simplicity.

In the other data transmission direction, that is to say from the analog adapter 6 to the digital adapter 5, the transmitter 16 of the analog adapter illustrated at the bottom of FIG. 4 uses the clock 23 of the terminal 6, which it has recovered in its receiving section 15. The purpose of the transmission part 16 of the analog adapter 6 is to produce an analog signal which, when it is sampled, has a value which, in the absence of noise and echo would be easily forecast as a function of the digital information transmitted by the analog adapter 6.

The ATT patent EP-0 669 740 and EURECOM patent FR 9512672 envisage that voltage values at the sampling instants should be equal to one of the nominal levels of the quantization law, with the drawbacks which stem from this, as explained above. However, according to the present invention, this limitation is not useful. This is because the echo of the signal produced by the digital adapter is added to the signal produced by the analog adapter, and shifts it in an unpredictable manner which is however known to the digital adapter, as described above. In the presence of an echo, the value of the signal at the moment of sampling could fall between two quantization levels, so that the noise would easily push it one side or the other.

It will be the role of the receiver of the digital adapter to retrieve the information from the quantized signal, and in this case it is worthwhile choosing values which make it possible to simplify the task of the receiver, for example by spacing the values apart in a different way from what would be permitted by the levels of the quantization law.

For example, it might be desired to send separate levels of 15 units, lying between −500 and +500 units. This would not be possible under the A law, in which the levels between −30 and +30 are separated by 2 units, those between 33 and 93 by 4 units, those between 99 and 219 by 8 units, etc.

The invention provides for the pulse response between the analog adapter 6 and the exchange 4 to be measured by the digital adapter 5, and communicated to the analog adapter 6 by check messages. On the basis of these measurements, the analog adapter 6 synthesizes a digital filter 24 so that the overall response (line 8+filters) is again a partial response, for example a class IV partial response, in particular modified so as to provide further attenuation near 0 Hz, within the 0 to 60 Hz band, or near 4000 Hz. This attenuation could also be determined adaptively. This technique is called "predistortion". The filter 24 also has an ancillary role, that of producing a signal at a rate of 16 kHz, particularly from an 8 kHz input originating from the analog adapter 6, in order to facilitate the design of the analog filter 25 which follows the D/A converter 26, which produces an analog signal from a digital signal.

Thanks to the use of the predistortion filter 24, an equation of the type Yn=Xn−Xn−2 (or some other) is again applicable, where Yn this time designates the signal at the exchange 4 and Xn the output level of the analog transmitter 16. It is necessary for Yn to correspond to one of the levels of the quantization law Sj so as to reduce the influence of noise. Consequently, the following relationship has to be satisfied:

$$Xn=Xn-2+Sj$$

If no precautions are taken, following this relationship may lead to over-large values for Xn.

Numerous techniques, known by the name of "line coding" are available to resolve this problem, for example in the form of a line coder 27, in particular the known Tomlinson-Harashima method. At this point, the person skilled in the art can easily choose a particular one of them.

We saw above that the presence of the echo may render the signal very sensitive to noise. It is therefore vital to use an error correcting system, typically a trellis modulation code. The use of a convolutional code or a block code may also be envisaged.

At the exchange 4, the signal Yn (corrupted by noise, as the case may be) is quantized and encoded into one byte which is transmitted to the receiving part 12 of the digital adapter 5, illustrated at the bottom of FIG. 3. Here, the bytes are converted into linear levels by the linear conversion unit 28 (using conversion law A, for example).

The resultant signal, like the estimate of the echo of the signal transmitted by the digital transmitter 11, is then processed in the decoder functional block 30.

The purpose of this block is to estimate the information item transmitted by the analog adapter.

The linear signal is the quantization of the sum of the signals representing the digital information item transmitted by the analog adapter, the echo of the signal transmitted by the digital adapter and the noise. The presence of the quantization prevents elimination of the echo by subtraction, as in conventional echo cancellers.

Unlike the Conventional method consisting in suppressing the echo by subtraction, followed by decoding of the useful signal, it is now necessary to deal jointly with the problems of echo compensation and detection of the signal transmitted by the analog adapter.

In the case of trellis coded modulation, this functional block 30 may take the form of a Viterbi algorithm so as to find the most likely path within a trellis diagram. The weights assigned to the branches in this diagram are the likelihood ratios of the quantized signals observed, given the estimated value of the echo and the assumption corresponding to the branch in question.

The output from the block 30 is transmitted, possibly across a buffer 31, to the user of the digital adapter 5.

As represented in FIG. 3, the error signal (difference between the received signal and the ideal signal) in the unit 30 of the Viterbi algorithm or of the decision-feedback system, is used in order to adapt the echo canceler 22, and to estimate the error due to incorrect synthesis of the predistortion filter 24 in the analog adapter 6. The correction information (encoded at a low rate) is multiplexed in the level selector 14 with the information originating from the user connected to the input of the digital adapter 5 (service channel), and transmitted to the analog adapter 6. It is used in the analog adapter in order to adapt the predistortion filter 24.

The analog adapter must also eliminate its own echo. The techniques to that effect are well known and an implementation is represented in FIG. 4, in the form of an echo filter 22.

As represented in FIG. 4, the error signal in the unit 20 corresponding to the Viterbi algorithm or to the decision-feedback system is used by the adaptation algorithms 34 to adjust the echo filter 22', the adaptive linear equalizer 17 and the local clock 23.

It is obvious that, as in conventional modem communications, recognition and learning sequences have to be exchanged when communication is established.

They serve to initialize the clocks and the adaptive filters. It is also necessary to check that one or other of the telephone exchanges 3, 4 can use either the A law or the mu law, and adapt itself consequently.

It results from the foregoing that the invention achieves its objectives, and makes it possible to link a digital line to an analog line in order to send digital information, directly and economically, without having to emulate an analog signal. This makes it possible to transmit at a rate substantially equal to that of a relatively high-speed digital line, while using a normal telephone line for the transmission.

The invention claimed is:

1. A communication system for communicating digital information, the communication system comprising a digital adapter (5) and an analog adapter (6), wherein the digital adapter (5) is linked to a digital exchange (3) by means of a digital interface (7) and the analog adapter (6) is linked to an analog exchange (4) by means of an analog interface (8), said exchanges (3,4) being linked by means of a telecommunications network (2), wherein said digital adapter and analog adapter include link means (11,12;15,16) for linking between the digital adapter (5) and the analog adapter (6), the digital information from the digital adapter (5) being sent to the analog adapter (6), and vice versa, in a digital form without emulating an analog signal, wherein said link means (11,12;15,16) include, in the direction of transmission going from the analog adapter (6) to the digital adapter (5), an analog transmitter (16) situated in the analog adapter (6) and able to transmit, to a digital receiver (12) situated in the digital adapter (5), an analog signal such that, when the analog signal is sampled by the analog interface of the exchange (4), the sample of the analog signal will equate to the sum of a value able to be determined by the digital information transmitted by the analog adapter (6) to the digital adapter (5) and of the echo of the signal transmitted by the digital adapter (5), without said value having to be equal to a level of a quantization law.

2. A system according to claim 1, wherein said transmitter (16) of the analog adapter (6) includes a line coder (27) followed by a predistortion filter (24) which synthesizes a partial response, in particular a class IV response.

3. A system according to claim 2, wherein said partial response is determined adaptively.

4. A communication system for communicating digital information, the communication system comprising a digital adapter (5) and an analog adapter (6), wherein the digital adapter (5) is linked to a digital exchange (3) by means of a digital interface (7) and the analog adapter (6) is linked to an analog exchange (4) by means of an analog interface (8), said exchanges (3,4) being linked by means of a telecommunications network (2), wherein said digital adapter and analog adapter include link means (11,12;15,16) for linking between the digital adapter (5) and the analog adapter (6), the digital information from the digital adapter (5) being sent to the analog adapter (6), and vice versa, in a digital form without emulating an analog signal, wherein the receiver of the analog adapter (6) includes an adaptive linear equalizer (17) connected at its input to the output of an analog/digital converter (19), and connected at its output to the input of an output equalizer (20) linked to the user's equipment, so that the response at the output of the adaptive linear equalizer (17) is a partial response, in particular a class IV response.

5. A system according to claim 4, wherein said partial response is determined adaptively.

6. A system according to claim 4 or claim 5, wherein said output equalizer (20) is a decision feedback equalizer or a Viterbi equalizer.

7. A communication system for communicating digital information, the communication system comprising a digital adapter (5) and an analog adapter (6), wherein the digital adapter (5) is linked to a digital exchange (3) by means of a digital interface (7) and the analog adapter (6) is linked to an analog exchange (4) by means of an analog interface (8), said exchanges (3,4) being linked by means of a telecommunications network (2), wherein said digital adapter and analog adapter include link means (11,12;15,16) for linking between the digital adapter (5) and the analog adapter (6), the digital information from the digital adapter (5) being sent to the analog adapter (6), and vice versa, in a digital form without emulating an analog signal, wherein said means (11, 12) include, at the digital adapter (5) end, an n-level selector (14), n being equal, particularly, to 64, said levels being represented in the form of a byte, from among N=256 possible quantization levels, said level selector (14) being connected, at its input, to the user's equipment and, at its output, to a digital interface.

8. A communication system for communicating digital information, the communication system comprising a digital adapter (5) and an analog adapter (6), wherein the digital adapter (5) is linked to a digital exchange (3) by means of a digital interface (7) and the analog adapter (6) is linked to an analog exchange (4) by means of an analog interface (8), said exchanges (3,4) being linked by means of a telecommunications network (2), wherein said digital adapter and analog adapter include link means (11,12;15,16) for linking between the digital adapter (5) and the analog adapter (6), the digital information from the digital adapter (5) being sent to the analog adapter (6), and vice versa, in a digital form without emulating an analog signal, wherein the digital adapter (5) includes a decoder (30) connected, at its input, to an echo filter (22) and to the output of the digital interface of the digital adapter (5), said decoder (30) delivering at its output to the user's equipment (9) the most likely sequence of groups of bits transmitted by the analog adapter (6), given the echo of the signal produced by the digital adapter (5).

9. A method of transmission from an analog adapter (6) to a digital adapter (5) in a communications system, said method including in the analog adapter the steps of:
   taking a succession of groups of bits from digital information originating from a data source connected to the analog adapter; and
   generating a succession of analog signals synchronized to a clock of the digital adapter, wherein each analog signal has an amplitude corresponding to a digital value of one of the groups of bits, wherein the successive analog signals interfere with one another, forming a resulting analog signal at an analog interface of an analog exchange of the communication system, and have a shape such that, at the moment when said resulting analog signal is sampled in the analog interface of the exchange, said resulting analog signal is substantially equal to the sum of a value determined by the digital information and of the echo of a signal being transmitted by the digital adapter (5), without said value having to be equal to a level of the quantization law, so that following the sampling of the resulting analog signal, a byte appears in the digital adapter (5), representing said sum.

10. The method according to claim 9, further comprising in the digital adapter the steps of:
   processing the successive groups of bits so as to retrieve the most likely sequence of the groups of bits, given the echo of the signal being transmitted by the digital adapter;
   transmitting the digital value of the groups of bits processed to an equipment of a user.

11. An analog adapter (6) for use in a communication system, wherein a digital adapter (5) of the communication system may be linked to a digital exchange (3) by means of a digital interface (7), and the analog adapter (6) may be linked to an analog exchange (4) by means of an analog interface (8), said exchanges (3,4) being linked by means of a telecommunications network (2), wherein said analog adapter includes at least a means (15) for receiving digital information from the digital adapter (5) being sent to the analog adapter (6) at a rate of at least 8000 digital information bearing symbols per second, wherein said means (15) forms a portion of the analog adapter (6) and includes an adaptive linear equalizer that forms a partial response output.

12. The device according to claim 11, wherein the information in each information bearing symbol is a group of bits originating from a digital data source and each information bearing symbol is a voltage level determined by choosing one voltage level from among a plurality of voltage levels that corresponds to the group of bits, a sequence of the voltage levels each said voltage level represented in digital form by one byte and being transmitted 8000 times per second.

13. An analog adapter apparatus, comprising:

means for taking a succession of groups of bits from digital information originating from a data source connected to the analog adapter system, each group of bits representing an item of the digital information to be transmitted to the digital adapter; and means for generating a succession of analog signals synchronized to a clock of the digital adapter, wherein each analog signal has an amplitude corresponding to a digital value of one of the groups of bits, wherein the successive analog signals interfere with one another, forming a resulting analog signal at an analog interface of an analog exchange of a communication system, and have a shape such that, at the moment when said resulting analog signal is sampled in the analog interface of the exchange, said resulting analog signal is substantially equal to the sum of a value determined by the digital information and of the echo of a signal being transmitted by the digital adapter (5), without said value having to be equal to a level of the quantization law, so that following the sampling of the resulting analog signal, a byte appears in the digital adapter (5), representing said sum.

* * * * *

UNITED STATES PATENT AND TRADEMARK OFFICE
CERTIFICATE OF CORRECTION

PATENT NO.        : 7,280,592 B1
APPLICATION NO.   : 09/051687
DATED             : October 9, 2007
INVENTOR(S)       : Pierre A. Humblet It is certified that error appears in the above-identified patent and that said Letters Patent is hereby corrected as shown below:

TITLE PAGE, ITEM (57)
"ABSTRACT", please delete "is" after "device"

IN THE SPECIFICATION:

COLUMN 2:
Line 49: Please delete "equalizer." and replace with --equalizer,--

COLUMN 4:
Line 16: Please insert --by-- after "represented"

COLUMN 5:
Line 58: Please delete "111" and insert --11--

COLUMN 7:
Line 8: Please delete "echo" and insert --echo,--

COLUMN 10:
Line 29: Please delete "(9)" and replace with --(9),--

Signed and Sealed this

Eleventh Day of August, 2009

David J. Kappos
*Director of the United States Patent and Trademark Office*